United States Patent
Iuliano

(10) Patent No.: US 7,699,464 B2
(45) Date of Patent: Apr. 20, 2010

(54) HYDRODYNAMICALLY OPERATED MULTIFOCAL CONTACT LENS

(75) Inventor: Michael J. Iuliano, Point Pleasant Beach, NJ (US)

(73) Assignee: In Technology Holdings LLC, Toms River, NJ (US)

( * ) Notice: Subject to any disclaimer, the term of this patent is extended or adjusted under 35 U.S.C. 154(b) by 163 days.

(21) Appl. No.: 11/326,261

(22) Filed: Jan. 5, 2006

(65) Prior Publication Data

US 2007/0153231 A1   Jul. 5, 2007

(51) Int. Cl.
*G02C 7/04* (2006.01)
(52) U.S. Cl. .................. 351/160 H; 359/665; 623/6.13; 351/161
(58) Field of Classification Search ............. 351/160 H
See application file for complete search history.

(56) References Cited

U.S. PATENT DOCUMENTS

| 4,477,158 A | 10/1984 | Pollack |
| 4,702,573 A | 10/1987 | Morstad |
| 6,836,374 B2 * | 12/2004 | Esch et al. ................. 359/665 |
| 7,261,736 B1 * | 8/2007 | Azar ........................ 623/6.22 |

FOREIGN PATENT DOCUMENTS

| DE | 35 14 746 | 10/1986 |
| WO | WO 92/03989 | 3/1992 |
| WO | WO 98/14820 | 4/1998 |

\* cited by examiner

*Primary Examiner*—Jessica T Stultz
(74) *Attorney, Agent, or Firm*—Gottlieb, Rackman & Reisman, P.C.

(57) ABSTRACT

This invention details a contact lens that uses a reservoir of fluid compressed by the lower lid to dynamically shift the refractive power of the lens. This creates a lens that has a plurality of focal points depending on the position of gaze. This can be accomplished through using fluid pressure to dynamically change the optical power in the visual axis of the eye.

16 Claims, 8 Drawing Sheets

Side View

Front View

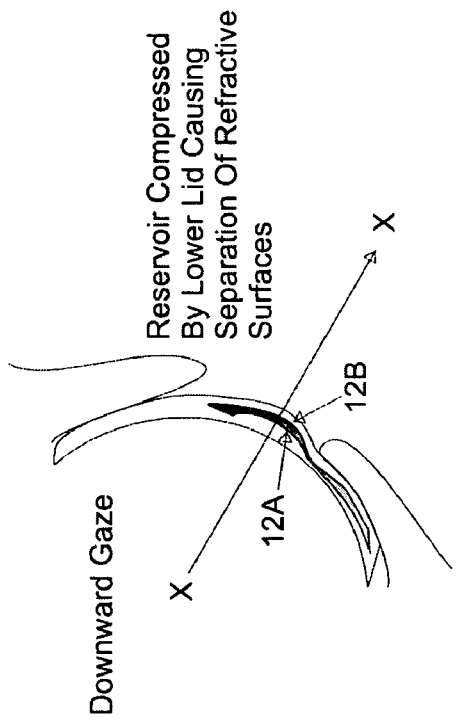
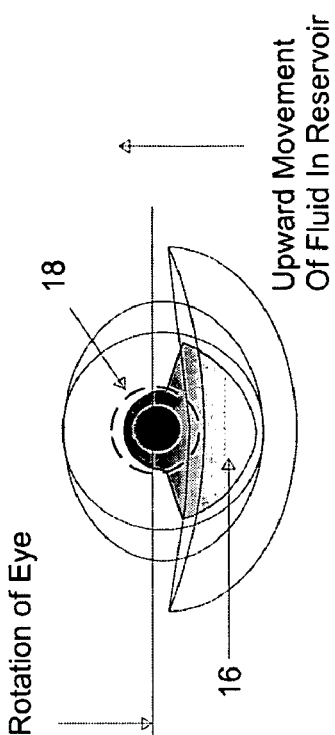
Figure 3A — Side View — Primary Gaze — Apposition Of Internal Plus Lens And Minus Refractive Surfaces 12A and 12B — Internal Fluid Reservoir
Figure 3C — Downward Gaze — Reservoir Compressed By Lower Lid Causing Separation Of Refractive Surfaces
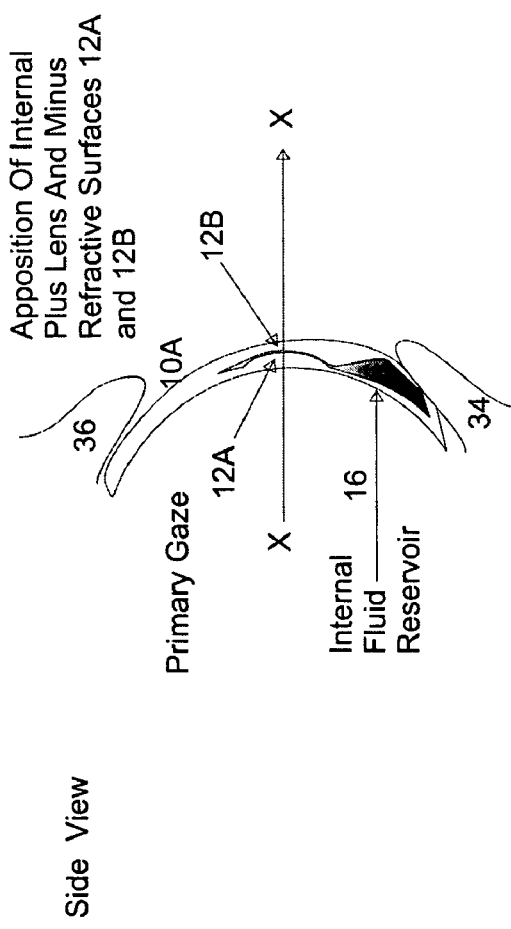
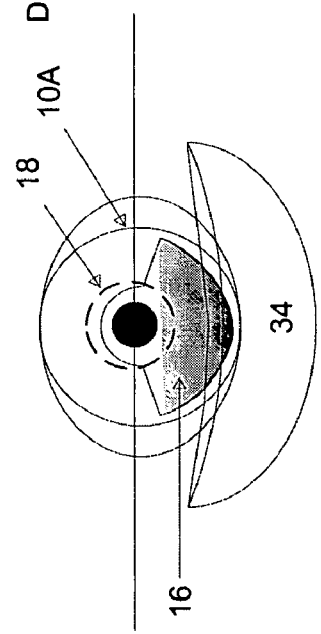
Figure 3B — Front View
Figure 3D — Downward Rotation of Eye — Upward Movement Of Fluid In Reservoir

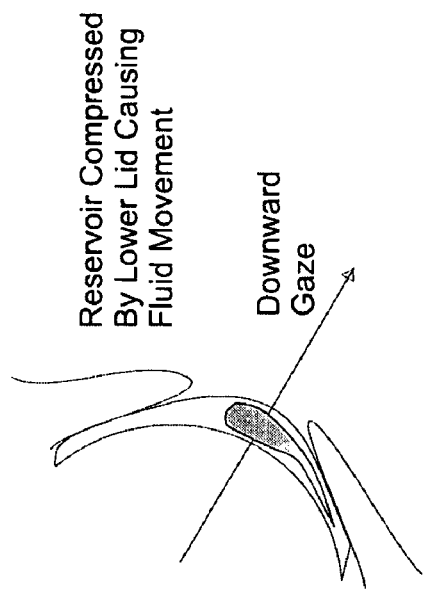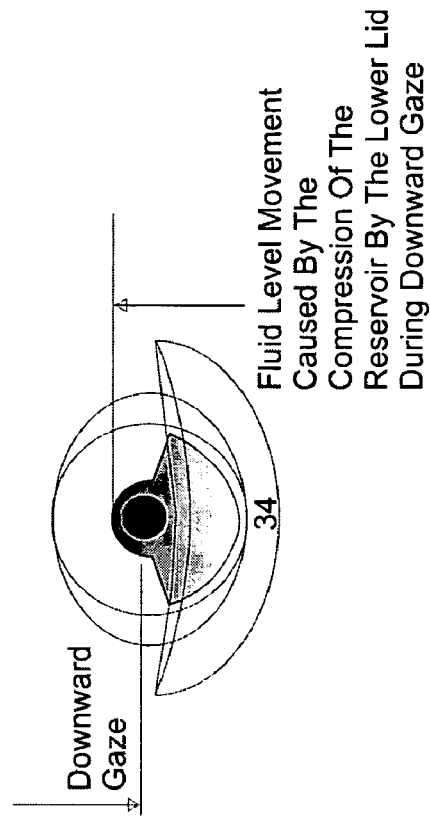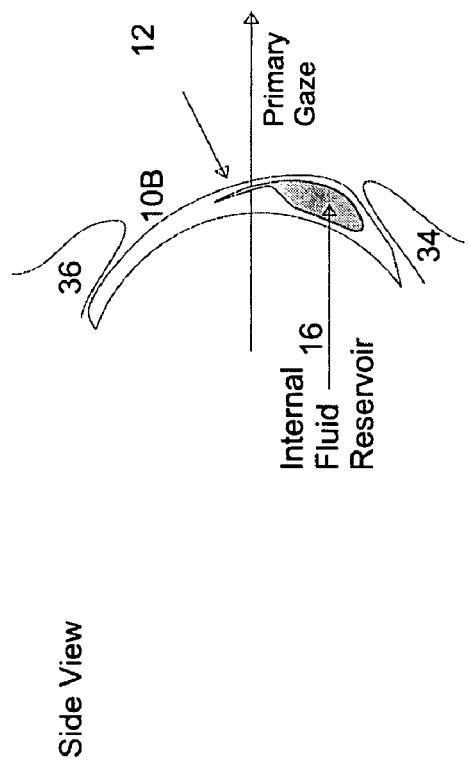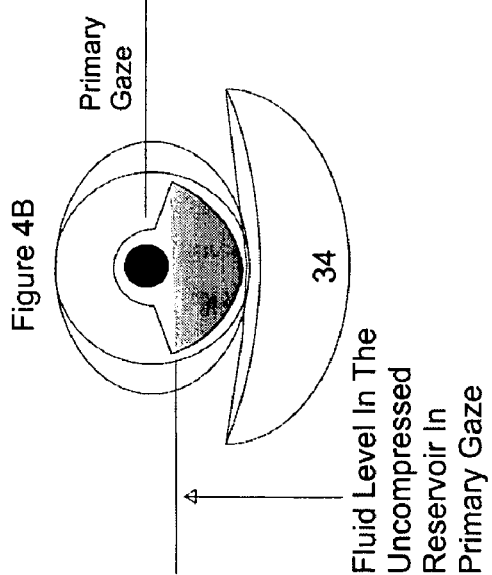

Side View — Primary Gaze

Front View

Downward Gaze

Separate Reservoirs Filled With Alternate Index Fluids Exchange Position In Visual Axis Depending On Gaze Upward Movement Of Fluid In Both Reservoirs

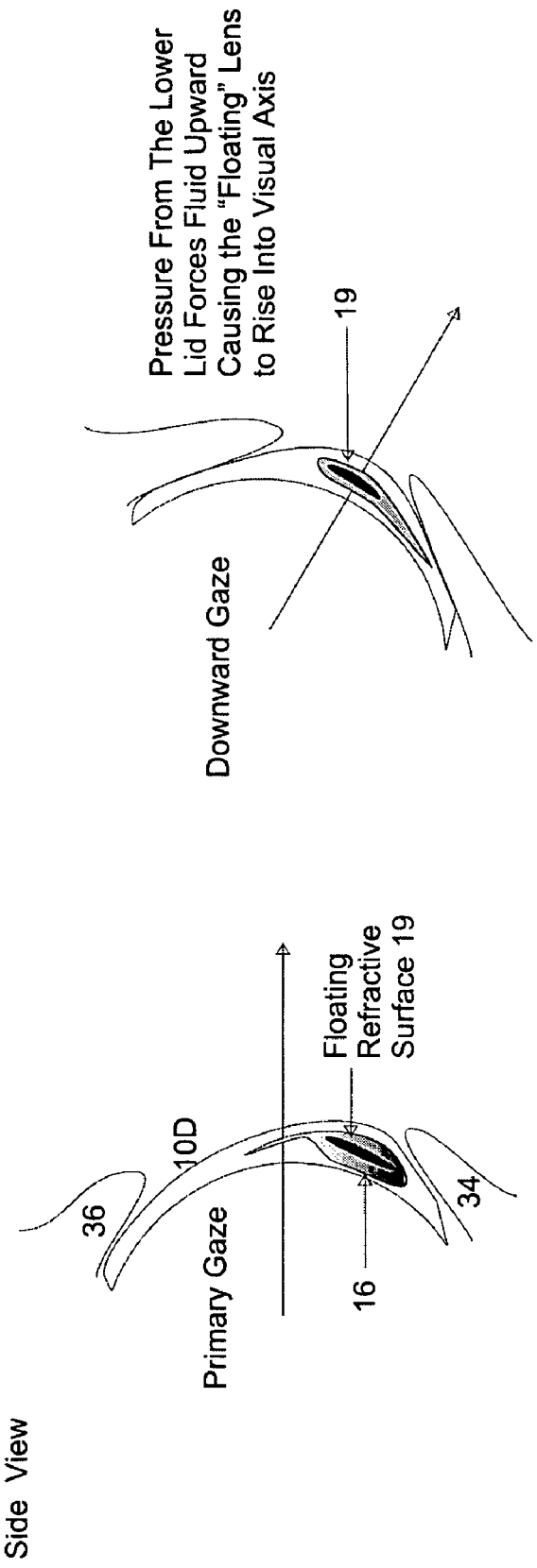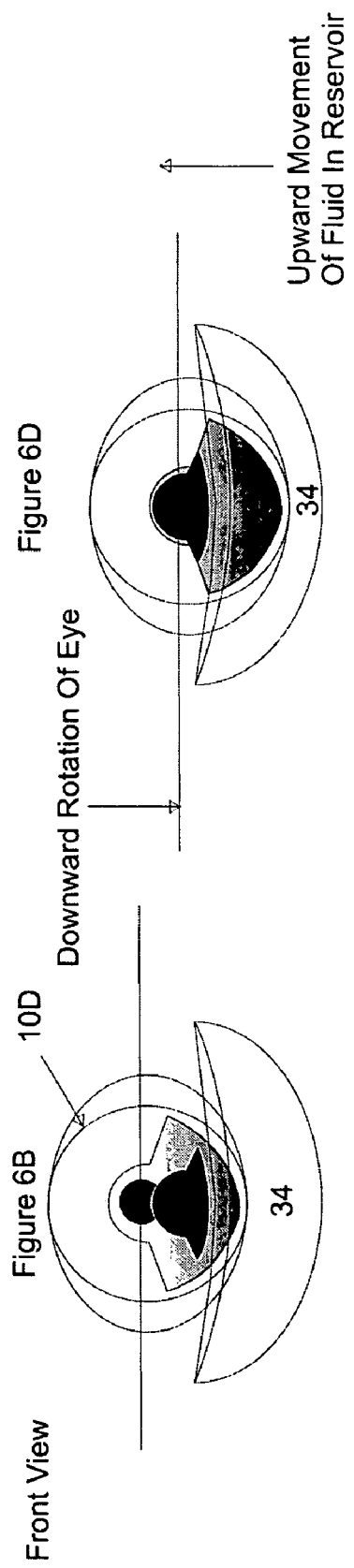

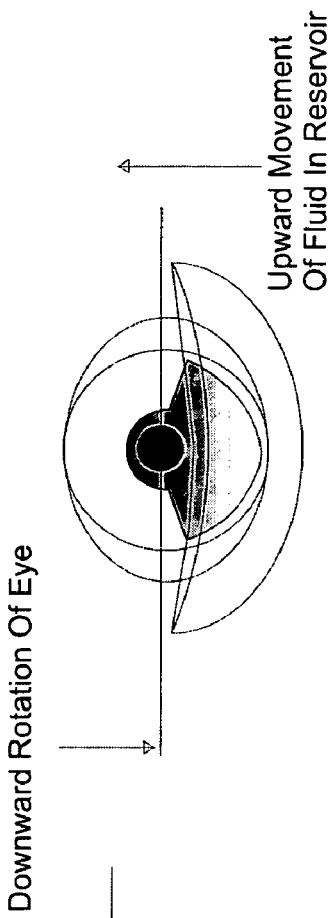
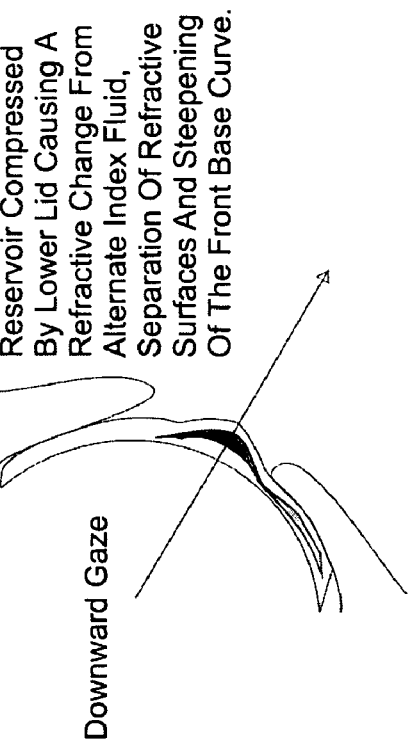
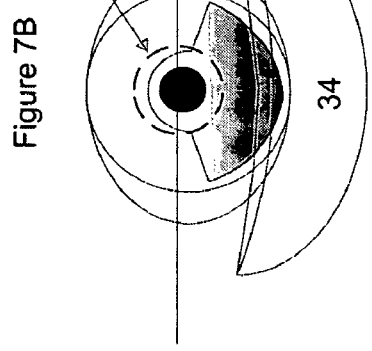
Figure 7A — Side View — Primary Gaze — Internal Fluid Reservoir
Figure 7B — Front View
Figure 7C — Downward Gaze — Reservoir Compressed By Lower Lid Causing A Refractive Change From Alternate Index Fluid, Separation Of Refractive Surfaces And Steepening Of The Front Base Curve.
Figure 7D — Downward Rotation Of Eye — Upward Movement Of Fluid In Reservoir

HYDRODYNAMICALLY OPERATED MULTIFOCAL CONTACT LENS

RELATED APPLICATIONS

None

BACKGROUND OF THE INVENTION

1. Field of the Invention

This invention deals with the art of vision correction through the application of a soft contact lens to the human eye. More particularly, details a novel method to dynamically altering the optical power of a soft contact lens, while in the eye, through gaze dependent use of fluid dynamics.

2. Description of the Prior Art

The human eye contains two main tissues or elements that act to focus light onto the retina. The cornea, which is the clear, watch crystal like tissue on the outside of the eye, focuses light coming from distant objects. The ability to see distant objects is referred to herein as distant vision.

The other tissue or element is the crystalline lens on the inside of the eye (i.e., disposed radially inwardly from cornea) that performs the focusing necessary to clearly image objects closer than approximately 20 feet, herein after referred to as near objects or near vision. The lens consists of concentric layers of protein arranged like an onion. As a person ages the lens gradually thickens and becomes less pliable. By the age of around 40, many people experience a condition known as of presbyopia or the inability for focus that results from this thickening of the lens.

Historically, presbyopia has been addressed with spectacle lenses or glasses. These glasses are available in two forms: with reading lenses and with multifocal lenses. Reading glasses are appropriate to correct near vision. Their disadvantage is that a wearer must remove them in order to see clearly at distance. Glasses with multifocal lenses, including bifocals and progressive, address both distance and near vision. These types of lenses have lens portions with different focal points. Generally in a bifocal the top portion of the lens is adapted to provide distance vision while the bottom portion near vision. The person wearing the glasses holds their head so that they can gaze through the top portion to see far objects. In order to see at near they would keep their head as if they were looking at a distance then rotate their eyes downward so that they can gaze through the bottom portion in order to clearly focus on near objects. Multifocal lenses, like trifocals and progressive, have several additional portions to provide accurate focusing for objects at various intermediate distances from a wearer.

Some forty years ago, contact lenses (or contacts) started to be used as a common alternative to glasses to address both distance and near blurred vision. Two types of contact lenses are presently in use: Rigid Gas Permeable or Hard contact lenses, (herein referred to as just hard lenses) and soft contact lenses. Hard contact lenses to correct distance vision generally are fit to partially rest up under the upper lid and move with the lid during the blink. Translating bifocal hard contact lenses work somewhat differently in that the lower edge of the contact rests against the lower lid so that as the wearer looks from a distant to a near object the lens stays stationary at the lower lid as the eye rotates downward so as to be looking through the near vision portion of the contact.

Soft contact lenses on the other hand drape on the cornea like a wet tee shirt and therefore remain essentially in the same location with respect to the optical axis of the eye even during the blink.

This presents a problem when one wants to create a bifocal soft contact lens because, no matter the direction of gaze, the visual axis of the eye always passes through the same portion of the lens. This problem is currently addressed by creating a contact that contains multiple refractive surfaces disposed directly along the visual axis. Examples of designs used for this purpose include aspheric, diffractive, concentric power rings, and refractive islands. Unfortunately all of these designs focus light coming from different distances onto the retina simultaneously. As one could imagine these designs result in "double or triple exposures" on the retina and significantly degrade the quality of the retinal image.

It is for this reason that development of a better soft bifocal contact lens is important.

SUMMARY OF THE INVENTION

As discussed above, a soft contact lens does not translate much on the eye so getting the eye to look through lens portions with different optical characteristics becomes a problem. The present invention provides a solution to this problem by providing a lens that changes its optical characteristics (e.g., its focal length or refractive power) dynamically in situ.

According to one embodiment of this invention a contact lens includes a reservoir of fluid. Preferably the reservoir is constructed and arranged so that it undergoes compression by the natural force of apposition the lids apply to the eye itself during downward gaze. This compression forces fluid inside the reservoir to dynamically alter the refractive power of the contact lens.

Advantageously, it is the position of gaze that alters the focal length. In other words the further the eye is in downward gaze the greater the power change to the lens. In effect this creates a continuous variable multifocal contact lens. This can be accomplished through using fluid pressure to:

1) Reshape the front surface of the contact into a steeper base curve;
2) Dynamically separate or alter two or more internal refractive surfaces of the contact lens, thereby producing in effect several coaxial lens;
3) Move an alternate index fluid into the visual axis;
4) Float an internal refractive surface into the visual axis;
5) Cause a combination of the above.

These principles may be used to provide other optical configurations as well. More specifically, the lens is constructed so that this wiping action causes a fluid reservoir to shift toward or away from a subject's axis of gaze, thereby causing a corresponding change in the optical power of the lens. Arrangements are disclosed in which the movement of the reservoir can increase or decrease the optical power of the lens, dependent on the correction required for the user.

BRIEF DESCRIPTION OF THE DRAWINGS

FIGS. 3A-3D show similar views for hydrodynamic shifting of internal refractive surfaces;

FIGS. 4A-4D show similar views for hydrodynamic shifting of refractive index fluid;

FIGS. 6A-6D show similar views for hydrodynamic shifting of an additional refractive surface into the visual axis; and FIGS. 7A-7D show similar views for hydrodynamic shifting involving a combination of alternate index fluid, separation of refractive surfaces and steepening of the front base curve.

DETAILED DESCRIPTION OF THE INVENTION

Once a soft contact lens is applied to the eye, surface tension maintains the lens in place in relation to various elements of the eye, such as the pupil. In other words, as a wearer looks, up, down or sideways, the lens on the eye maintains its position and allows the wearer to look through the lens. The present inventor has discovered that this phenomenon in combination with a lens having new physical characteristics are also useful for other purposes, including changing the refractive characteristics of the lens. More specifically, a soft contact lens is disclosed that changes its refractive characteristics dynamically. The changes are caused by the engagement and wiping action between the outer surface of the lens and the eye lids.

The following examples illustrate various embodiments of the invention.

Hydrodynamically Reshaping the Surface of the Lens

Figure 1:
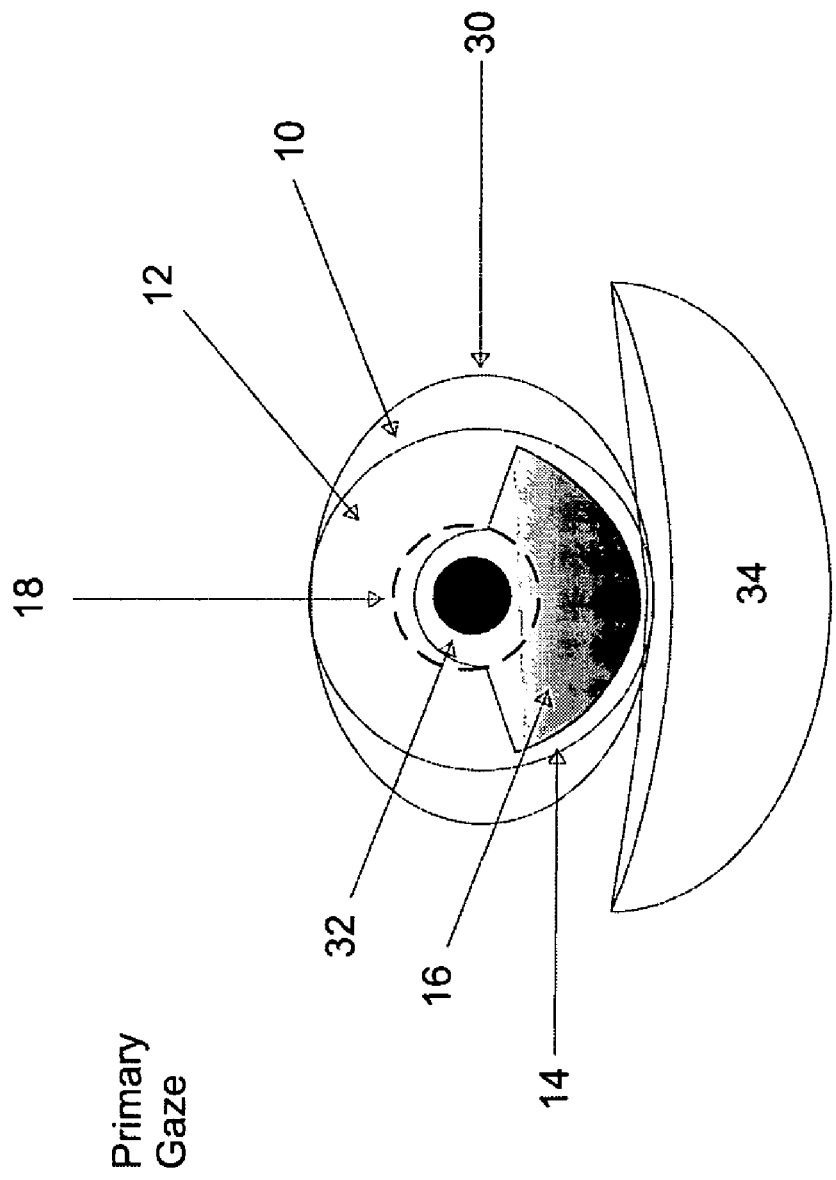
FIG. 1 shows a contact lens with a fluid reservoir in accordance with this invention.

This embodiment can be accomplished by creating, for example, a reservoir inside the contact lens or through a laminating process. A lamination process may for example entail shaping two contact lens surfaces joined peripherally to define a reservoir therebetween having predetermined shape. As shown in FIG. 1, a lens 10 constructed in accordance with this invention is formed a shell having an upper section 12 that has the same characteristics as standard distant vision contact lens, which may or may not have any optical effects, and a lower section 14 that is formed with the reservoir 16. This reservoir 16 has a shaped somewhat like the letter D facing downward with an upwardly extending circular section 18 projecting into the center of the contact. When the contact 10 is placed into an eye 30, the reservoir 16 extends from the lower portion of the contact lens up into the visual axis that passes the pupil 32. The reservoir 16 is filled with fluid, such as saline, contact lens lubricants or artificial tears or other non-toxic material such liquid silicone. In the area of the visual axis defined during the primary gaze, the inner back surface and inner front of the reservoir are in apposition. The outer most layer of the reservoir is distensible. Upon insertion, the weight of the reservoir causes the lens to take the position shown in the Figures, i.e., with the reservoir disposed at the bottom portion of the lens.

Figure 2A:
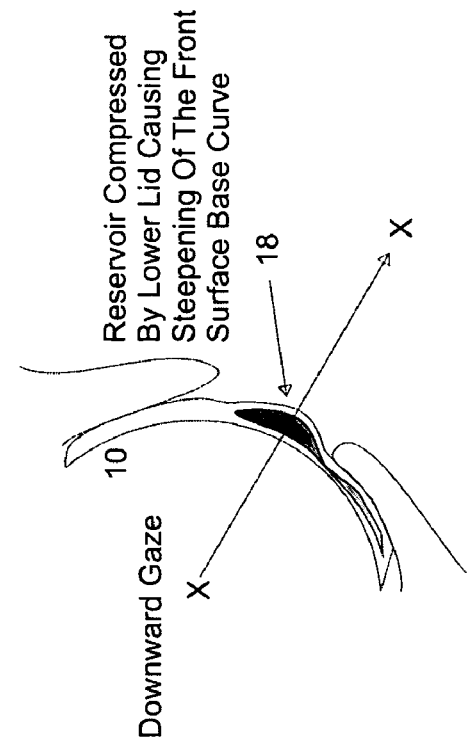
FIGS. 2A-2B show, respectively, a side and a front view of an eye with the lens of FIG. 1 being configured for distant vision.

When the person gazes straight forward for distant vision, they are looking along an optical axis that passes through the section 18 of reservoir 16. In this position, the fluid is primarily deposed in the lower portion of the reservoir 16 as shown in FIGS. 2A, 2B. In this configuration, the portion of the lens 10 through which the wearer is looking through has either no optical effect on the wearer's vision, or is configured to provide distant vision.

Figure 2C:
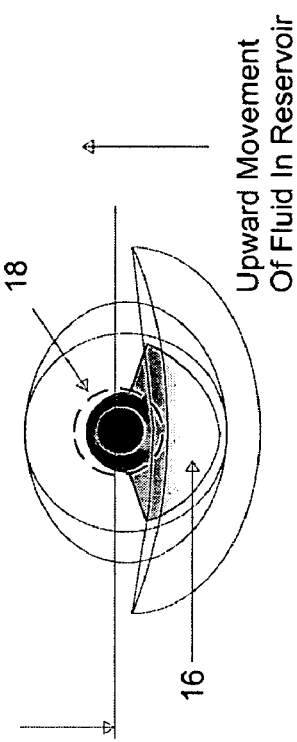
FIGS. 2C and 2D show, respectively, a side and a front view of an eye with the lens of FIG. 1 being configured for near vision via hydrodynamic alteration of the front base curve.
Figure 2B:
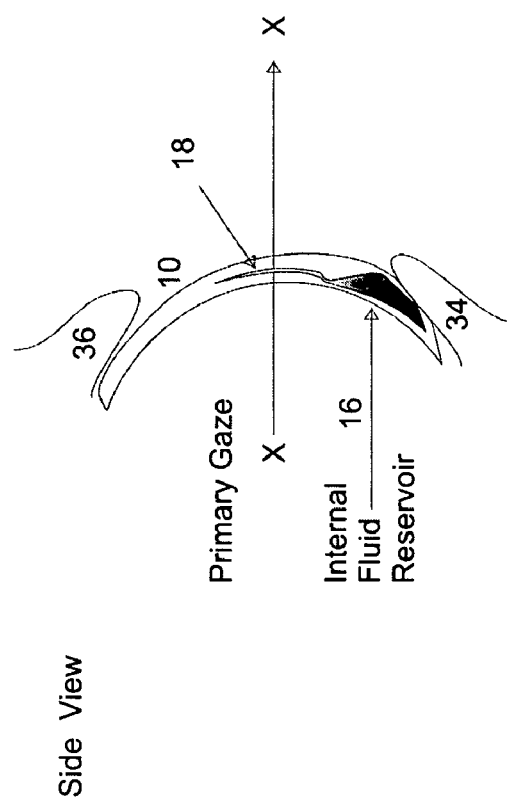
Figure 2D:
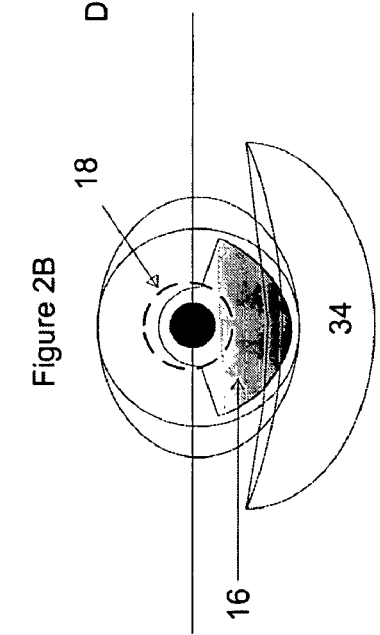

In order to change to near vision, the eye is lowered, and the pressure of the lower lid 34 on the contact lens 10 causes the fluid in the reservoir to rise, thereby filling and expanding reservoir section 18, as shown in FIGS. 2C, 2D. In other words, the lower lid 34, which normally applies pressure directly to the eyeball during downward gaze, now is used to compress the lower section of this reservoir and force the fluid up into the visual axis section 18. As a result, section 18 is deformed to a steeper base curve causing a shift in the refractive power of the contact lens (see FIGS. 2C and 2D). The term 'steepen' is a term of the art and it relates to a distortion of a lens that causes the lens to become more convex. Advantageously, depending the depth of downward gaze, which controls the amount of fluid that reaches into section 18, which controls the overall change in front surface base curve, which induces the refractive power change of the contact lens, this lens is capable of producing a smooth progression of near addition power similar to that of a progressive lens. In essence what this does, for example, is to take a lens used to correct myopia and gradually makes it less minus by increasing its front base curve in the visual axis. (The same is true for a plus lens but instead of decreasing its power the increase of the base curve would increase its refractive power.) This in turn creates a gaze dependent multifocal contact lens via in situ alteration of the base curve.

To return to distant vision focus, the wearer looks up which carries the contact lens up from behind the lower lid releasing the pressure on the lower reservoir and allowing the fluid from section 18 to flow down and return to the bottom of the lens, away from the optical axis X-X. This action is further assisted by the upper lid which acts as a squeegee, (utilizing the same "force of apposition" during a blink), causing the upper section of the reservoir to empty back into the lower portion of the reservoir. This re-flattens the distended outer surface base curve of the contact lens thereby returning the focus to distance.

In this embodiment, the lens shell formed of sections 12 and 14 and the liquid in the reservoir have the same index of refraction, e.g., 1.4. Therefore even when the liquid in the reservoir is squeezed upward, as in FIGS. 2C, 2D, the various elements of the contact lens 10 cooperate to form a effectively a single lens along axis 18.

Method of Hydrodynamically Separating and/or Altering Two or More Internal Refractive Surfaces Lens 10A in FIGS. 3A-3D is also formed of two lens sections 12, 14 that form a shell for a reservoir 16 with an upper reservoir section 18. The reservoir is filled with a fluid as shown. This embodiment is accomplished by providing the upper section 12 of lens 10A of FIGS. 3A and 3B with internal refractive surfaces 12A, 12B separated by the reservoir section 18. When the wearer is looking straight ahead, as in FIGS. 3A and 3B, section 18 is drained with the fluid disposed in the lower portion of reservoir 16, and the lens section 12 has virtually no optical effect except that induced by the outer front and back surface of the contact lens. In order to change to near vision the wearer looks down. As the contact lens moves behind the lower lid 34 the normal force of lid apposition to the globe compresses the lower portion of the reservoir 16 to force the fluid up into the visual axis section 18 thereby separating the sections 12A, 12B. This pressure not only creates a separation between the two internal optical surfaces but also could flattens or steepens the front portion of the reservoir to cause a further shift in the optical power of section 18. The section 18 now provides refractive power and causes a shift in the refractive power of the contact lens 10A. Depending on the depth or angle of gaze, which controls the amount of fluid that reaches into section 18, that controls the amount of internal lens separation and base curve change, the overall refractive change will vary gradually from that of the just the external contact lens surfaces to that of the external surfaces plus the amount induced in section 18. In essence what does for example is to take a minus lens used correct myopia and gradually makes it less minus by decreasing its overall refractive power in the visual axis. This in turn creates a gaze dependent multifocal contact lens via in situ alteration of refractive surfaces.

Then to return to distance vision, the wearer looks up causing the contact lens to move up from behind the lower lid 34. This action in turn releases the pressure on the lower reservoir 18, allowing the fluid to return to the lower portion of the reservoir. This action is again assisted by the upper lid 36 which acts as a squeegee, (utilizing the same "force of apposition" during a blink), causing the fluid in the visual to empty back into the lower portion of the reservoir 16. This causes the two internal refractive surfaces to come into apposition thereby returning the focus of the eye to distant vision. In this embodiment, the fluid is selected so that it has a different index of refraction then lens sections 12 and 14. For example, if the fluid in the reservoir 16 is a salient solution, its index of refraction can be changed from 1 to 2 merely by changing its salt concentration. When the reservoir is drained so that all its fluid is in the lower portion, the inner surfaces of the shell 12 are in contact with each other, and, optically, they have no effect. Therefore in the configuration of FIGS. 3A and 3B, the lens along the visual axis X-X is essentially a single lens. However, when the reservoir section 18 is filled with the fluid, the lens is defined by three lens sections: a front lens section, a liquid lens formed by reservoir section 18 and a rear section.

Method of Hydrodynamically Shifting the Refractive Index

The embodiment of FIGS. 4A-4D are similar to the one in FIG. 3A-D, the main difference being that, when filled, the upper reservoir section 18 has a a much larger thickness then the lens section 12. As a result, when the reservoir section 18 is filled, because of its thickness optical characteristics of the reservoir section 18 override the characteristics of section 12, and essentially this reservoir section dominates the optical characteristics of the lens 10.

In one embodiment, reservoir 16 of contact lens 10B (having the same construction as 10 and 10A, except as noted) is filled with a fluid having a refractive index that is lower then that of the lens. For example, the fluid may be saline, which has an index of refraction of about 1.34 while the contact lens has an index of refraction of 1.42. As a result, with the eye gazing forward and the fluid deposed primarily in the lower portion of the reservoir, area 18 has virtually no effect on the optical characteristics of the lens 10B. As the wearer looks down, pressure from lid 34 causes the fluid to rise into section 18 thereby dynamically changing the overall index of refraction of the contact lens 10 to that of the fluid within the reservoir section 18. Depending the depth of gaze, which controls the amount of fluid that reaches into section 18, the overall index change will vary from that of the just the contact to that of mostly the refractive fluid. In essence what does, for example, is to take a minus lens used correct myopia and gradually makes it less minus by decreasing its overall index of refraction in the visual axis. This in turn creates a gaze dependent multifocal contact lens via in situ alteration of refractive index. (The same process is true with a plus lens except the fluid index should be higher to cause the overall power of the contact to become more plus).

Then to return to distance vision, the wearer looks up causing the contact lens to move up from behind the lower lid 34. This action in turn releases the pressure on the lower reservoir 18, allowing the fluid to return to the lower portion of the reservoir. This action is again assisted by the upper lid 36 which acts as a squeegee, (utilizing the same "force of apposition" during a blink), causing the fluid in the visual axis of section 18 to empty back into the lower portion of the reservoir 16. This causes the two internal walls of the reservoir or refractive surfaces to come into apposition thereby returning the refractive index back to that of just the contact lens material, which returns the focus of the eye to distant vision.

To summarize, in the embodiment of FIGS. 4A-4B, glancing downward causes the lens along the visual axis to change from a refractive power defined by the material of lens section 12 to the refractive power of the fluid in the reservoir.

Figure 5A:
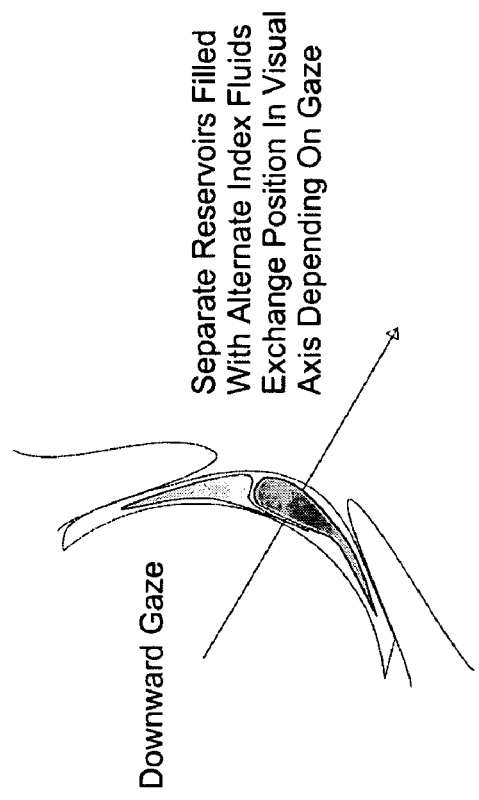
FIGS. 5A-5D show similar views for alternate method of hydrodynamic shifting of refractive index fluids.
Figure 5B:
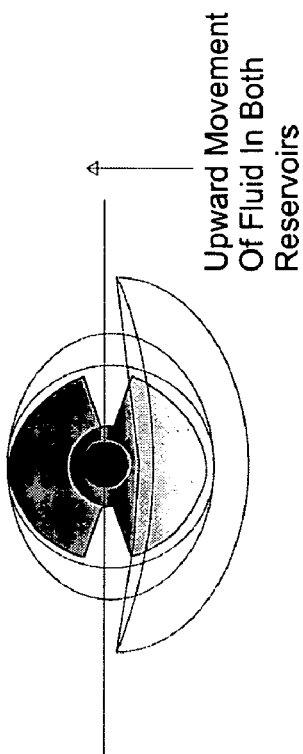
Figure 5C:
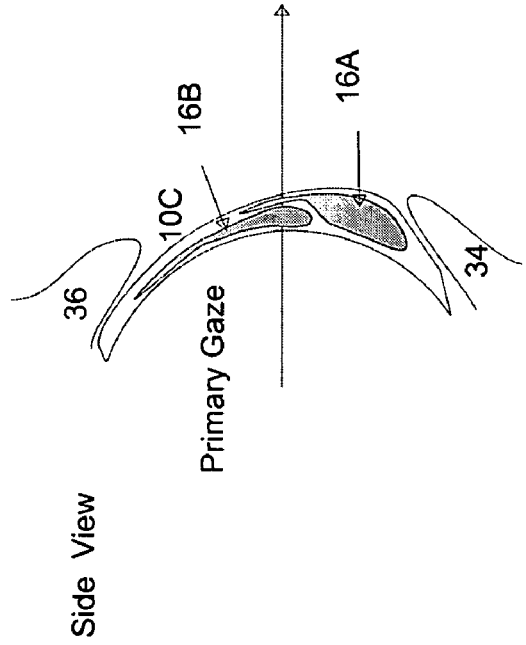
Figure 5D:
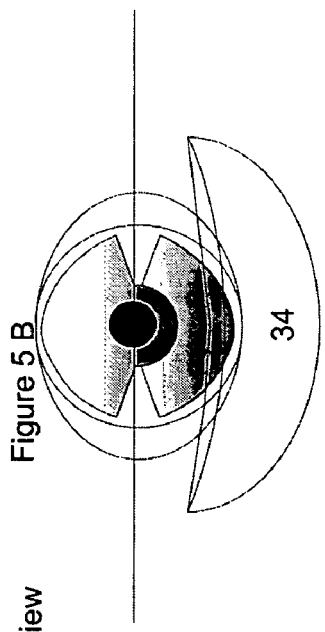
Figure 8A:
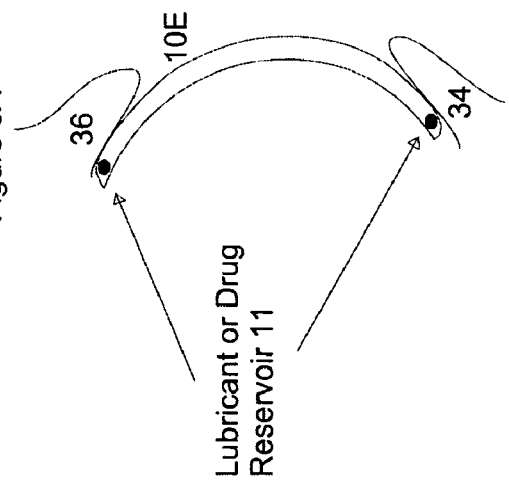
FIGS. 8A-8D show how a peripheral ring reservoir capable of releasing lubricants or medication could be used alone or in conjunction with the above figures.
Figure 8C:
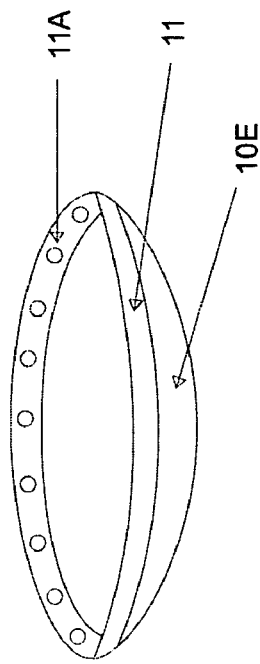
Figure 8B:
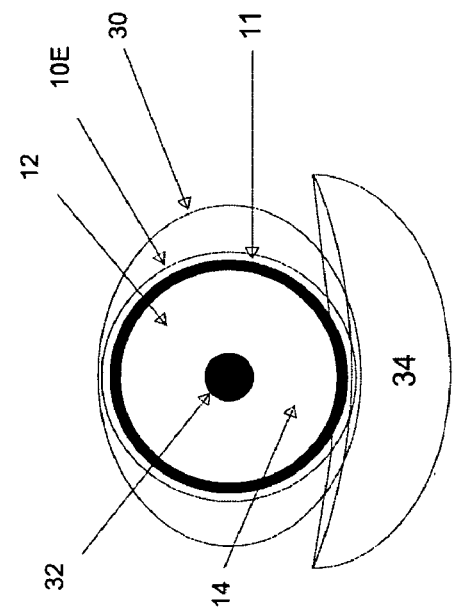
Figure 8D:
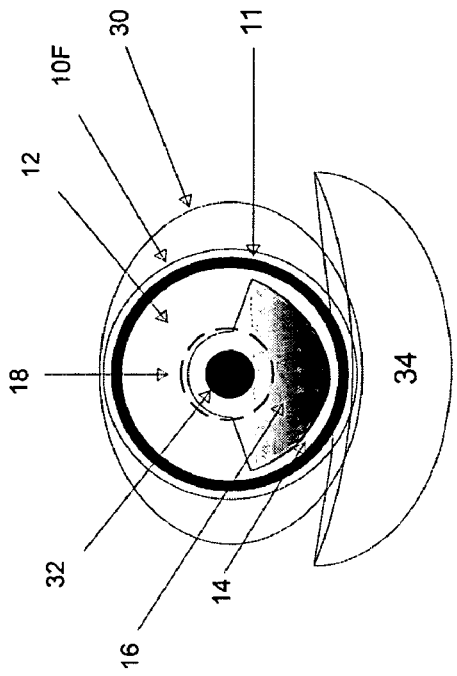

An Alternate Method of Hydrodynamically Shifting the Refractive Index: Multiple Reservoirs with Differing Refractive Index Fluids This embodiment is similar to the embodiment described above with respect to FIGS. 3A-3D, with the main difference being that the lens 10C is provided with at least two reservoirs 16A, 16B, one near lid 37 and the other near lid 36. Preferably, for a minus lens, the upper reservoir 16B is filled with a fluid having an index of refraction equal to or higher than that of the contact lens index of refraction while the lower reservoir 16A is filled with a fluid being equal to or lower than that of the contact lens. These indexes are selected so that overall index of refraction in section 18 of lens 10C, has an index of refraction that provides distant vision correction when looking straight (FIGS. 5A, 5B), and intermediate or near vision correction when looking down (FIGS. 5C, 5D.) As before, in order to change to near focus use the "natural force of apposition" the lower lid applies to the eyeball itself during downward gaze to compress the lower reservoir. This causes the displacing the fluid present in reservoir section 16A in the lower and exchanges the index fluid present in the visual axis thereby shifting the refractive power of the contact lens (see FIGS. 5A-5D).

Then to return to distance focus, the wearer looks up which carries the contact lens up from behind the lower lid releasing the pressure on the lower reservoir. This action allows the upper lid to act as a squeegee, (utilizing the same force of apposition during a blink), returning each reservoir to its pre-downward gaze state which in turn reverts the focus the contact lens to distance. Importantly, as seen in FIGS. 5A and 5C, while the eye is gazing straight the optical power of the lens is provided predominately by the fluid in the reservoir section 16B. While the eye is gazing down, the optical power of the lens is provided primarily by the fluid in reservoir 16A. When the eye is gazing somewhere in between distance and near the index present in section 18 will be a combination of reservoirs 16A and 16B.

Method of Moving an Additional Refractive Surface into the Visual Axis

This embodiment is accomplished by creating a reservoir 16 inside the contact lens 10D having about the same size and shape as in the previous embodiments. A different feature in this embodiment is that floating in the fluid there is a refractive insert 19 made of a lower density or lower specific gravity material than that of the fluid. For example, if the fluid is made of saline of density 1.003, then insert 19 could be made of a convex bag completely filled with mineral oil of density 0.822. Since the density of the mineral oil is less that that of saline then the insert will float. This plus lens insert could also be made of a low density plastic like low density polyethylene which has a specific gravity of about 0.9. The rest of the operation of contact lens 10D is the same as in the embodiments described.

For far correction, the optical power is provided by upper section 12. For near vision correction, compression by the lower section of this reservoir to force the fluid up causing the floating refractive insert 19 to rise into the visual axis thereby shifting the refractive power of the contact lens (see FIGS. 6A-6D). Then to return to distance focus, the wearer looks up which carries the contact lens up from behind the lower lid releasing the pressure on the lower reservoir and thereby lowering the insert 19 out of the visual axis.

Hydrodynamically Induced Refractive Change from Alternate Index Fluid, Separation of Refractive Surfaces and Steepening of the Front Base Curve This embodiment shown in FIGS. 7A-7D is a combination of the features of FIGS. 2, 3, and 4 and is accomplished by creating, for example, a reservoir inside the contact lens or through a laminating process. This reservoir would extend from the lower portion of the contact lens up into the visual axis. The lower section would be filled with an alternate index fluid (see FIG. 1). In the area of the visual axis, in primary gaze, the inner back surface of the reservoir and inner front of the reservoir are both refractive surfaces and are in apposition. The outer most layers of both the reservoir and contact are distensible (see FIG. 7). Next, in order to change to near focus use the "natural force of apposition" the lower lid applies to the eyeball itself during downward gaze to compress the lower section of this reservoir to force the fluid up into the visual axis portion thereby shifting the index of refraction in the visual axis while separating the internal refractive surfaces of the reservoir and additionally deforming the outside front surface of the contact lens into a steeper base. The combination of these hydrodynamically induced changes to the contact lens will result in a shift in the refractive power of the contact lens. Then to return to distance focus, the wearer looks up which carries the contact lens up from behind the lower lid releasing the pressure on the lower reservoir. This action allows the upper lid to act as a squeegee, (utilizing the same "force of apposition" during a blink), causing the upper section of the reservoir 18 to empty back into the lower portion of the reservoir. This shift the index of refraction back to the pre-downward gaze state, re-appositions the internal refractive surfaces of the reservoir, and re-flattens the outer surface of the contact lens thereby returning the focus to distance.

FIGS. 8A-8D show how a contact lens may also be changed to include an ocular drug delivery system. In these Figures, a reservoir 11 is provided inside the contact lens 10E having size and shape of a ring bag at the periphery of the contact lens FIGS. 8B and 8D. A different feature in this embodiment is that the reservoir is not completely sealed. In other words the construction of this reservoir permits its fluid contents to slowly leak out under pressure from the lids during the blink. This is somewhat similar to the way in which the eyelid margin expresses the oil from the meibomian glands. This could be accomplish by providing perforations or holes 11A in the reservoir 11 on the surface contact lens that is intended to be juxtaposed to the cornea, 10E of FIG. 8C or 10F of FIG. 8D or changes to the matrix the contact to allow it to become excessively permeable around the ring reservoir. This ring reservoir could be added to a vision correction or bandage contact lens and filled with lubricants or medications so as to increase the contact lens comfort or to treat dry eye with a constant release of lubricants or to make it become an effective ocular drug delivery system.

The preceding sections are a general description of how hydrodynamic forces can be employed to alter the refractive nature of a contact, lens, improve their comfort and or create an ocular drug delivery system. It is not meant to be an exhaustive or limiting only instructive on the general implementation of fluid dynamics to either induce refractive changes and or create fluid delivery systems in a contact lens. Obviously, to anyone skilled in the art, numerous variations, combinations or other modifications can easily be envisioned or implemented to the invention without departing from its scope as defined in the appended claims.

I claim:

1. A contact lens with variable focus comprising:
   a lens body arranged and constructed to fit over only a portion of the eye of a person to improve the person's eye sight, said body being disposed between the eye lids and the eye when the contact lens is disposed on the eye, said body being made of a soft material and having an optical axis; and
   a reservoir disposed within the lens body and holding a fluid;
   wherein said lens body and said reservoir are arranged to provide a first shape for said lens body having a first optical characteristic along said optical axis when the wearer looks substantially along a first direction and a second shape having a second optical characteristic along said optical axis when the wearer looks in a second direction at an angle with respect to said first direction, the change in between said first and second shape resulting from the movement of fluid in said reservoir due to the squeezing action of at least one of the eye lids on the lens body.

2. The lens of claim 1 wherein said lens body is changed between said first and second shape by selectively steepening said shape.

3. The lens of claim 1, wherein said reservoir includes a first reservoir section disposed away from said optical axis and a second reservoir section being intersected by said optical axis and wherein the first shape is defined with the second section being substantially empty of said fluid and the second shape being defined by the second reservoir section being filled with said fluid, said fluid being squeezed from said first said second reservoir section by the squeezing action of the respective eye lid.

4. The lens of claim 3 wherein said reservoir is filled with a liquid having the same index of refraction as the lens body.

5. The lens of claim 3 wherein said reservoir is filled with a liquid having an index of refraction different from that of the lens body.

6. A soft contact lens comprising:
   a round lens body with a visual axis through which a wearer is gazing, said round lens body being sized to fit only on a portion of the eye of a person with the visual axis corresponding to the optical axis of the eye;
   a reservoir formed within the lens body and holding a fluid, said reservoir including a first section and a second section, said reservoir cooperating with said lens body to provide the lens body with one of a first body shape having a first optical characteristic and a second body shape having a respective second optical characteristic along said visual axis, based on the amount of fluid in said sections, said first and second sections being arranged to cause the fluid to flow between said sections resulting from the wiping action of the eye lids of the wearer as the wearer looks alternatively straight, or at an angle.

7. The soft contact lens of claim 6 wherein said reservoir is adapted to selectively steepen the curvature of the lens as said fluid is transferred from one section to another.

8. The soft contact lens of claim 7 wherein said fluid has the same index of refraction as said lens body.

9. The soft contact lens of claim 6 wherein said fluid has a different index of refraction then said lens body.

10. The soft contact lens of claim 9 wherein said visual axis passes through said first section and wherein when said first section is filled with liquid, said lens body and said reservoir cooperate to form a multi-lens path along said visual axis including a back portion of said lens body, said first section and a front portion of said lens body.

11. The soft contact lens of claim 9 wherein said visual axis passes through said first section and wherein when said first section is filled with liquid, said lens has an optical power that is primarily dependent on the optical characteristics of said fluid.

12. The soft contact lens of claim 6 further comprising a secondary lens body disposed in said reservoir, said secondary lens being movable between said first and second sections.

13. The soft contact lens of claim 6 wherein said lens body is formed with a first and a second reservoir, each reservoir including a first and a second section and a liquid that is selectively shifted between said first and second sections to selectively alter the optical power of said lens.

14. A soft contact lens comprising:
a lens body having an upper portion, a central portion including a visual axis through which a wearer is gazing and a lower portion when the lens body is disposed in an eye;
a reservoir between two interior walls within the lens body, said reservoir holding a fluid, said reservoir selectively separating the two interior walls along said visual axis to change the shape of the lens body and the optical power of the lens body along said visual axis, said reservoir extending into said central and lower portion but not to the upper portion of said lens.

15. The soft contact lens of claim 14 wherein said fluid is a liquid having an index of refraction that is substantially the same as the index of refraction of the lens body.

16. The soft contact lens of claim 15 wherein said fluid is a liquid having an index of refraction that is different then that of the lens body.

* * * * *